(12) United States Patent
Lin et al.

(10) Patent No.: US 9,124,395 B2
(45) Date of Patent: *Sep. 1, 2015

(54) SOUNDING MECHANISM UNDER CARRIER AGGREGATION

(71) Applicant: MEDIATEK INC., Hsinchu (TW)

(72) Inventors: Chih-Yuan Lin, Yilan County (TW); Yu-Hao Chang, Taichung County (TW)

(73) Assignee: MEDIATEK INC. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/467,046

(22) Filed: Aug. 25, 2014

(65) Prior Publication Data

US 2014/0362811 A1 Dec. 11, 2014

Related U.S. Application Data

(63) Continuation of application No. 13/134,811, filed on Jun. 17, 2011, now Pat. No. 8,837,394.

(60) Provisional application No. 61/356,077, filed on Jun. 18, 2010.

(51) Int. Cl.
  *H04W 72/04* (2009.01)
  *H04L 5/00* (2006.01)

(52) U.S. Cl.
  CPC ........... *H04L 5/0048* (2013.01); *H04W 72/042* (2013.01); *H04L 5/001* (2013.01); *H04L 5/0091* (2013.01)

(58) Field of Classification Search
  CPC .... H04L 5/0048; H04L 5/001; H04W 72/042
  USPC ........................................................ 370/329
  See application file for complete search history.

(56) References Cited

U.S. PATENT DOCUMENTS

| | | | |
|---|---|---|---|
| 2009/0181687 A1 | 7/2009 | Tiirola et al. | 455/450 |
| 2009/0262856 A1 | 10/2009 | Onggosanusi et al. | 375/267 |

(Continued)

FOREIGN PATENT DOCUMENTS

| | | |
|---|---|---|
| CN | 101771463 A | 1/2009 |
| CN | 101594683 A | 6/2009 |

(Continued)

OTHER PUBLICATIONS

International Search Report and Written Opinion of International Search Authority for PCT/CN2011/075966 dated Sep. 22, 2011 (10 pages).

(Continued)

*Primary Examiner* — Melvin Marcelo
(74) *Attorney, Agent, or Firm* — Imperium Patent Works; Zheng Jin

(57) ABSTRACT

Sounding mechanism for LTE-A systems under carrier aggregation is provided. A UE receives an uplink or downlink grant transmitted from an eNB over a primary carrier in a multi-carrier LTE-A system. The UE determines indicated carrier(s) and detects a triggering condition for aperiodic sounding transmission in the grant. The UE then selects UE-specific sounding reference signal (SRS) parameters. Finally, the UE transmits an aperiodic SRS (ap-SRS) over the indicated carrier(s) using the selected UE-specific SRS parameters. In one embodiment, the uplink or downlink grant is transmitted via a PDCCH carrying various DCI formats. Each DCI format contains a carrier indicator field (CIF) that indicates which carrier is used for ap-SRS transmission if cross-carrier scheduling is enabled. In another embodiment, DCI format 3/3A is transmitted via a PDCCH carrying a plurality of information fields, each field indicates if the UE should enable ap-SRS in a particular carrier.

20 Claims, 4 Drawing Sheets

(56) References Cited

U.S. PATENT DOCUMENTS

| | | | |
|---|---|---|---|
| 2009/0274076 A1 | 11/2009 | Muharemovic et al. | 370/280 |
| 2010/0080187 A1 | 4/2010 | Papasakellariou et al. | 370/329 |
| 2010/0172235 A1 | 7/2010 | Liu et al. | 370/208 |
| 2010/0246561 A1 | 9/2010 | Shin et al. | 370/345 |
| 2011/0280220 A1 | 11/2011 | Jia et al. | 370/335 |
| 2012/0002746 A1 | 1/2012 | Pham | 375/295 |
| 2012/0069812 A1 | 3/2012 | Noh et al. | 370/329 |
| 2012/0093119 A1 | 4/2012 | Kim et al. | 370/329 |
| 2012/0182957 A1 | 7/2012 | Noh et al. | 370/329 |
| 2012/0224557 A1 | 9/2012 | Noh et al. | 370/329 |
| 2012/0252474 A1 | 10/2012 | Tiirola et al. | 455/450 |
| 2012/0300740 A1 | 11/2012 | Iwai et al. | 370/329 |
| 2013/0028134 A1 | 1/2013 | Wang et al. | 370/254 |
| 2013/0028138 A1 | 1/2013 | Hao et al. | 370/254 |
| 2013/0163571 A1 | 6/2013 | Ouchi et al. | 370/336 |
| 2013/0294400 A1* | 11/2013 | Liu | 370/330 |
| 2014/0341167 A1* | 11/2014 | Chen et al. | 370/329 |

FOREIGN PATENT DOCUMENTS

| | | |
|---|---|---|
| CN | 101765134 A | 1/2010 |
| CN | 101827444 A | 3/2010 |
| CN | 101808409 A | 4/2010 |
| CN | 101917259 A | 8/2010 |
| CN | 101917765 A | 8/2010 |
| CN | 101958772 A | 9/2010 |
| JP | 2012521173 | 3/2009 |
| JP | 2012538779 A | 3/2010 |
| WO | WO2010110526 A1 | 3/2009 |

OTHER PUBLICATIONS

International Search Report and Written Opinion of International Search Authority for PCT/CN2011/081753 dated Feb. 16, 2012 (10 pages).

USPTO, Office Action for related U.S. Appl. No. 13/373,071 dated Jul. 10, 2013 (20 pages).

USPTO has prepared an Office Action for related U.S. Appl. No. 13/373,071 dated Dec. 16, 2013 (14 pages).

R1-102114, 3GPP TSG RAN1 #60bis, Motorola, Aperiodic SRS for LTE-A, Beijing, China, Apr. 12-16, 2010 (2 pages).

JP Office Action for JP patent application 2013-514545 dated Dec. 17, 2013 (4 pages).

R1-100643 3GPP TSG RAN WG1 Meeting #59bis, LG Electronics, Blind Decoding Reduction Methods for Carrier Aggregation, Valencia, Spain, Jan. 18-22, 2010 (5 pages).

R1-091692 TSG-RAN WG1 #57, NEC Group, PDCCH Structure for LTE-Advanced System, San Francisco, CA. US May 4-8, 2009 (8 pages).

R1-084474 TSG-RAN1 #55, Nortel Networks, Support of Wider Bandwidth for LTE-Advanced, Prague, Czech, Nov. 10-14, 2008 (10 pages).

EPO Search Report for EP patent application 11795203 dated Dec. 18, 2013 (14 pages).

R1-103187 3GPP TSG RAN WG1 Meeting #61, Motorola, LTE-A Dynamic Aperiodic SRS-Triggering Duration Timing and Carrier Aggregation, Montreal, Canada, May 10-14, 2010 (4 pages).

R1-100860 TSG-RAN WG1 #60, Ericsson et al., Further Discussions on SRS Enhancements, San Francisco, USA, Feb. 22-26, 2010 (3 pages).

R1-101189 3GPP TSG RAN WG1 #60, Samsung, SRS Enhancements in Rel-10, San Francisco, USA, Feb. 22-26, 2010 (4 pages).

JPO Office Action for JP patent application 2013-536994 dated Mar. 18, 2014 (4 pages).

R1-102966, 3GPP TSG RAN WG1 Meeting #61, Nokia Siemens Networks, Nokia, Dynamic aperiodic SRS, Montreal, Canada, May 10-14, 2010 (2 pages).

R1-105439, 3GPP TSG WG1 Meeting #62bis, NTT DOCOMO, Views on Signaling for Dynamic Aperiodic SRS, Xian, China, Oct. 11-15. 2010 (7 pages).

R1-105633, 3GPP TSG RAN WG1 Meeting #62bis, Motorola, Dynamic Aperiodic sounding and Carrier aggregation, Xi'an, China, Oct. 11-15, 2010 (2 pages).

R1-102765, 3GPP TSG RAN WG1 #61, Qualcomm Incorporated, Further details on aperiodic dynamic SRS, Montreal, Canada, May 10-14, 2010 (3 pages).

R1-102114, 3GPP TSG RAN1#60bis, Motorola, Aperiodic SRS for LTE-A, Beijing, China, Apr. 12-16, 2010 (2 pages).

R1-105291, 3GPP TSG RAN WG1 #62bis, Texas Instruments, Resource Allocation and Signaling for Aperiodic Sounding, Xian, China, Oct. 11-15, 2010 (4 pages).

The Taiwan IPO has prepared an Office Action for TW patent application 100121171 dated Apr. 8, 2014 (8 pages).

SIPO, Office Action for CN patent application 201180004213.6 dated Nov. 15, 2014 (8 pages).

R1-103156; Motorola, CMCC; Aperiodic SRS Design for LTE-A; 3GPP TSG RAN1#61; May 10-14, 2010; Montreal, Canada (2 pages).

R1-101940; Huawei; CQI/PMI/RI Reporting for Carrier Aggregation; 3GPP TSG RAN WG1 Meeting #60bis; Apr. 12-16, 2010; Beijing, China (5 pages).

R1-100133; Samsung; Configuring SRS Transmissions in Rel.10; 3GPP TSG RAN WG1 #59bis; Jan. 19-23, 2010; Valencia, Spain (3 pages).

* cited by examiner

SOUNDING MECHANISM UNDER CARRIER AGGREGATION

CROSS REFERENCE TO RELATED APPLICATIONS

This application is a continuation, and claims priority under 35 U.S.C. §120 from nonprovisional U.S. patent application Ser. No. 13/134,811, entitled "Sounding Mechanism Under Carrier Aggregation," filed on Jun. 17, 2011, the subject matter of which is incorporated herein by reference. Application Ser. No. 13/134,811, in turn, claims priority under 35 U.S.C. §119 from U.S. Provisional Application No. 61/356,077, entitled "Sounding Operation under Carrier Aggregation Scenarios," filed on Jun. 18, 2010; the subject matter of which is incorporated herein by reference.

TECHNICAL FIELD

The disclosed embodiments relate generally to wireless network communications, and, more particularly, to sounding channel signaling in LTE-A systems under carrier aggregation.

BACKGROUND

Orthogonal Frequency-Division Multiple Access (OFDMA) is a multi-user version of the Orthogonal Frequency-Division Multiplexing (OFDM) digital modulation technology. In wireless OFDMA systems, however, multipath is an undesirable common propagation phenomenon that results in radio signals reaching the receiving antenna by two or more paths. Signal variations in amplitude or phase resulted from multipath are also referred as channel response. Transmission techniques, in which a transmitter makes use of the channel response between the transmitter and a receiver, are called close-loop transmission techniques. In multiple-input multiple-output (MIMO) applications, close-loop transmission techniques are much more robust as compared with open-loop MIMO techniques.

One method of providing channel information to the transmitter is via the use of an uplink (UL) sounding channel. Channel sounding is a signaling mechanism where a mobile station (also referred to as a user equipment (UE)) transmits sounding reference signals (SRS) on an uplink channel to enable a base station (also referred to as an eNodeB) to estimate the UL channel response. Channel sounding assumes the reciprocity of uplink and downlink channels, which is generally true in Time Division Duplexing (TDD) systems. Because the frequency bandwidth of the UL transmission encompasses the frequency bandwidth of the DL transmission in TDD systems, UL channel sounding can enable close-loop SU/MU-MIMO in downlink transmission. For example, the eNodeB can perform non-codebook based downlink beamforming based on channel state information (CSI) measured via SRS. UL channel sounding can also enable UL close-loop MIMO transmission in both TDD and Frequency Division Duplexing (FDD) systems. For example, the eNodeB can perform codebook based uplink beamforming by choosing the best precoding weights (vectors/matrices) (e.g., select the best PMI from the codebook) to be used for the UE based on CSI measured by SRS, such that the UE can perform close-loop SU/MU-MIMO in UL transmission. In TDD system, UL channel sounding can also be used for frequency selective scheduling, where the eNodeB schedules the UE to its best frequency band in both downlink and uplink transmissions.

In 3GPP LTE-Advanced (LTE-A) wireless communication systems, two types of SRS are defined. A first type of Periodic SRS (p-SRS) is used for obtaining long-term channel information. The periodicity of p-SRS is in general long (up to 320 ms) to reduce overhead. The p-SRS parameters are configured by higher layer radio resource control (RRC), so configuration time is long (e.g., 15-20 ms) and flexibility is low. For uplink MIMO supported in Release 10, p-SRS resource is highly demanded for close-loop spatial multiplexing, especially when the number of UEs becomes large. A second type of Aperiodic SRS (ap-SRS) is a new feature introduced in Release 10. Ap-SRS is triggered either by downlink or uplink grant via physical downlink control channel (PDCCH). Once triggered, the UE transmits a sounding sequence in a pre-defined location for one-time transmission. Ap-SRS supports multi-antenna sounding for uplink MIMO. Ap-SRS is much more flexible than p-SRS. Ap-SRS can use residual resource that is not used by p-SRS by multiplexing between ap-SRS and p-SRS.

Carrier aggregation (CA) is introduced as part of the overall 4G enhancement in 3GPP LTE-A systems. With carrier aggregation, an LTE-A system can support peak target data rates in excess of 1 Gbps in the downlink (DL) and 500 Mbps in the uplink (UL). Such technology is attractive because it allows operators to aggregate several smaller contiguous or non-continuous component carriers (CC) to provide a larger system bandwidth, and provides backward compatibility by allowing legacy users to access the system by using one of the component carriers. Under carrier aggregation, each UE has one primary carrier (i.e., Pcell) and multiple secondary carriers (i.e., Scell). In cross-carrier scheduling scenario, PDCCH is received via Pcell only. Channel sounding, however, shall be configured in both Pcell and Scell. How to apply PDCCH in Pcell to trigger ap-SRS in Scell is a problem faced in LTE-A sounding under carrier aggregation.

SUMMARY

Sounding mechanism for LTE-A systems under carrier aggregation is provided. A user equipment (UE) receives an uplink or downlink grant transmitted from a base station (eNB) over a primary carrier in a multi-carrier LTE-A system. The UE determines indicated carrier(s) and detects a triggering condition for aperiodic sounding transmission in the uplink or downlink grant. The uplink or downlink grant is transmitted via a Physical Downlink Control Channel (PDCCH). The UE then selects UE-specific sounding reference signal (SRS) parameters if the triggering condition is true. The UE-specific SRS parameters are configured via upper layer radio resource control (RRC) signaling. Finally, the UE transmits an aperiodic SRS (ap-SRS) over the indicated carrier(s) using the selected UE-specific SRS parameters.

In one embodiment, the uplink grant is transmitted via a PDCCH carrying DCI format 0 or 4, and downlink grant is transmitted via a PDCCH carrying DCI format 1A, 2B, or 2C. Each DCI format contains a carrier indicator field (CIF) if cross-carrier scheduling is enabled. The CIF is used for scheduling PUSCH transmission or PDSCH reception. In one novel aspect, ap-SRS is transmitted on the same carrier indicated by the CIF to achieve cross-carrier scheduling.

In another embodiment, DCI format 3/3A is transmitted via a PDCCH to a group of UEs. DCI format 3/3A contains a plurality of information fields, each field also can be used to indicate if a UE should enable ap-SRS in a particular carrier. The location of each information field corresponds to an indicated carrier of the UE, while the value of each information field corresponds to a triggering condition. Once triggered, the UE transmits an ap-SRS over the indicated one or more carriers. Multiple carriers may be indicated in the same PDCCH.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
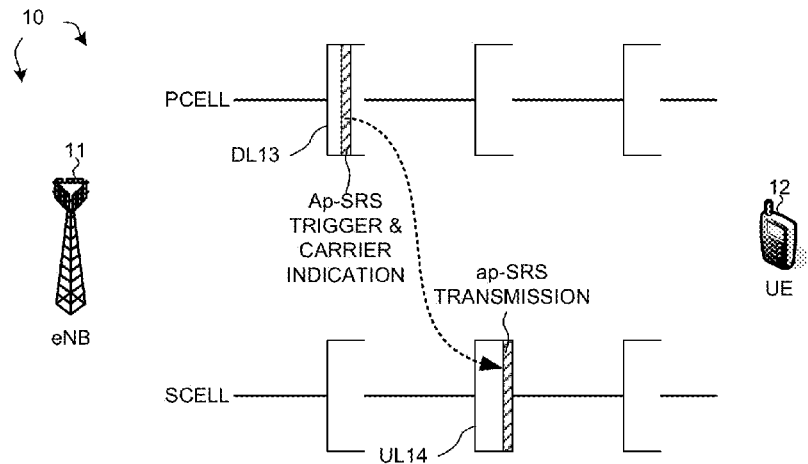
FIG. 1 illustrates uplink channel sounding in multi-carrier wireless communication systems in accordance with one novel aspect.

FIG. 1 illustrates uplink channel sounding in a multi-carrier 3GPP LTE-A wireless communication system 10 in accordance with one novel aspect. In LTE wireless communication systems, a base station (also referred to as an eNB, e.g., eNB11) and a mobile station (also referred to as a user equipment (UE), e.g., UE12) communicate with each other by sending and receiving data carried in a series of frames. Each frame comprises a number of downlink (DL) subframes for the eNB to transmit data to the UE, and a number of uplink (UL) subframes for the UE to transmit data to the eNB. Uplink channel sounding is a signaling mechanism to facilitate various close-loop transmission techniques such as DL/UL beamforming and frequency selective scheduling. For uplink channel sounding, the eNB configures sounding reference signal (SRS) parameters and allocates SRS resource in a previous DL subframe (e.g., subframe DL13), and the UE transmits a sounding signal in a subsequent UL subframe (e.g., DL14) to enable the eNB to estimate UL channel response.

In 3GPP LTE-A systems, two types of SRS are defined for uplink channel sounding. A first type of Periodic SRS (p-SRS) is used for obtaining long-term channel response information. The periodicity of p-SRS is in general long (up to 320 ms). The p-SRS parameters are configured and triggered by higher layer radio resource control (RRC), so configuration time is long (e.g., 15-20 ms delay) and flexibility is low. A second type of Aperiodic SRS (ap-SRS) is also configured via RRC. Ap-SRS, however, is dynamically triggered by an uplink or downlink grant from the eNB. Once triggered, the UE transmits a sounding signal to the eNB in a pre-defined location. Ap-SRS is a new feature introduced in Release 10 that supports multi-antenna sounding for uplink MIMO. Ap-SRS is much more flexible than p-SRS and can use residual resource that is not used by p-SRS by multiplexing between ap-SRS and p-SRS.

Traditionally, p-SRS parameters are configured via RRC. To dynamically trigger and configure ap-SRS parameters, however, the use of higher layer RRC is no longer efficient because of the long latency. Therefore, a faster physical layer signaling method is desirable for triggering ap-SRS and configuring ap-SRS parameters. In one example, ap-SRS may be triggered via a physical downlink control channel (PDCCH) that provides reasonable flexibility. In multi-carrier LTE-A systems with carrier aggregation, each UE has one primary carrier (i.e., Pcell) and multiple secondary carriers (i.e., Scell). In cross-carrier scheduling scenario, PDCCH is received via Pcell only. Uplink channel sounding, however, shall be configured in both Pcell and Scell.

In one novel aspect, an example of uplink channel sounding using ap-SRS with cross-carrier scheduling is illustrated in FIG. 1. Base station eNB11 transmits ap-SRS triggering information in an uplink grant over a primary carrier (e.g., PCELL) in a previous downlink subframe DL13. Based on the ap-SRS triggering information, UE12 detects a triggering condition and carrier indication information in the uplink grant. If the triggering condition is true, then the UE selects the latest RRC configured UE-specific ap-SRS parameters. Finally, UE12 transmits an ap-SRS over an indicated carrier (e.g., SCELL) in a subsequent uplink subframe UL14 by following the selected UE-specific ap-SRS parameters.

Figure 2:
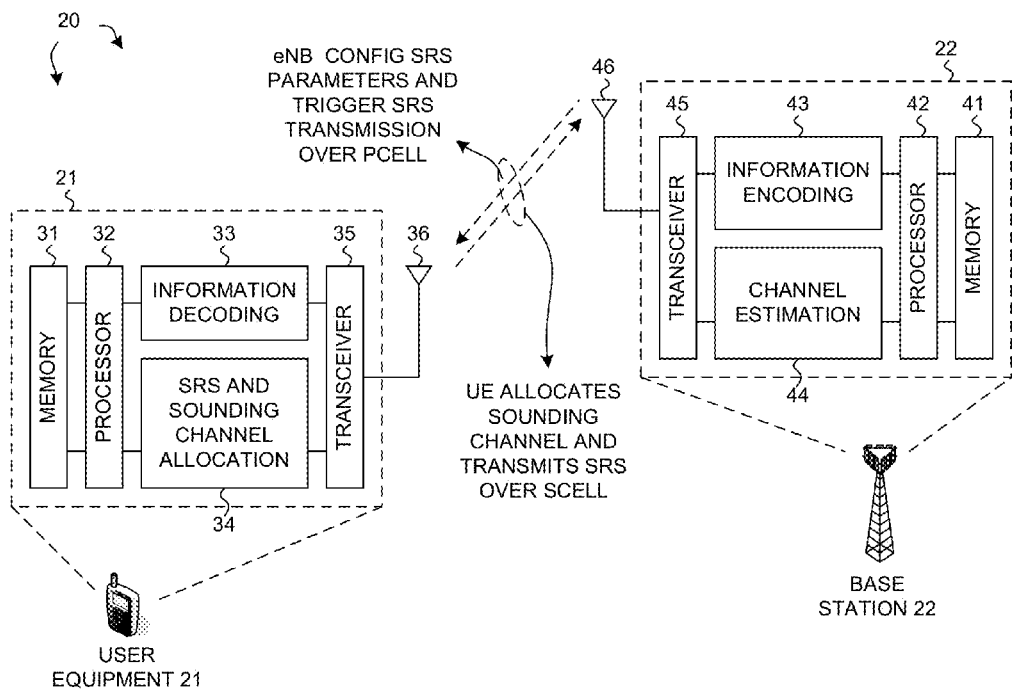
FIG. 2 illustrates a multi-carrier LTE-A wireless communication system with uplink channel sounding in accordance with one novel aspect.

FIG. 2 illustrates a multi-carrier 3GPP LTE-A wireless communication system 20 with uplink channel sounding in accordance with one novel aspect. LTE-A system 20 comprises a user equipment UE21 and a base station eNB22. UE21 comprises memory 31, a processor 32, an information-decoding module 33, an SRS and sounding channel allocation module 34, and a transceiver 35 coupled to an antenna 36. Similarly, eNB22 comprises memory 41, a processor 42, an information-encoding module 43, a channel estimation module 44, and a transceiver 45 coupled to an antenna 46.

For multi-carrier uplink channel sounding, eNB22 configures SRS parameters and allocating SRS resource by transmitting encoded signaling information to UE21 in a DL subframe over a primary carrier (e.g., PCELL). Based on the signaling information, UE21 decodes the SRS parameters and transmits a sounding signal via an allocated sounding channel in a UL subframe back to eNB22 over an indicated secondary carrier (e.g., SCELL) for uplink channel estimation. In one or more exemplary embodiments, the functions described in the uplink sounding procedure may be implemented in hardware, software, firmware, or any combination thereof by the different modules. The functions described above may be implemented together in the same module, or implemented independently in separate modules. For example, at the eNB side, information-encoding module 43 prepares an uplink grant with carrier indication information and ap-SRS triggering information, and transceiver 45 transmits the uplink grant to UE21 over PCELL. At the UE side, information-decoding module 33 detects the carrier indication information and the ap-SRS triggering information, SRS and sounding channel allocation module 34 maps an ap-SRS in an allocated sounding channel, and transceiver 35 transmits the ap-SRS back to UE22 over the indicated carrier (e.g., SCELL). Finally, at the eNB side, transceiver 45 receives the ap-SRS, and channel estimation module 44 estimates uplink channel response based on the received ap-SRS.

Figure 3:
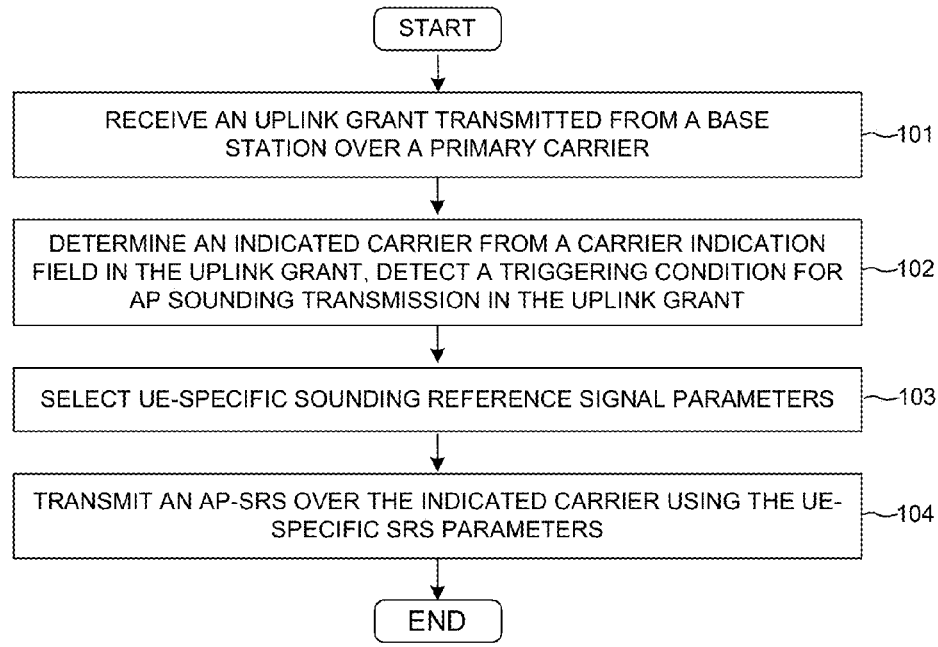
FIG. 3 is a flow chart of a first method of uplink ap-SRS transmission in accordance with one novel aspect.

FIG. 3 is a flow chart of a first method of uplink ap-SRS transmission in a multi-carrier LTE-A system in accordance with one novel aspect. The multi-carrier LTE-A system comprises an eNB and a UE. The eNB and the UE are connected over multiple radio frequency carriers including a primary RF carrier (e.g., PCELL over PCC) and one or more secondary RF carriers (e.g., SCELLs over SCCs). In step 101, the UE receives an uplink or downlink grant transmitted from the eNB over PCELL. In step 102, the UE determines an indicated carrier (e.g., one of the SCELLs) from a carrier information field (CIF) in the grant and detects a triggering condition for ap-SRS transmission in the grant. If the triggering condition is true, then the UE select the latest UE-specific RRC messages based on the value of CIF (step 103). Finally, the UE transmits an ap-SRS over the indicated carrier using the selected UE-specific SRS parameters (step 104). The first method of uplink ap-SRS triggering mechanism is also referred to as "UE-specific triggering".

Figure 4:
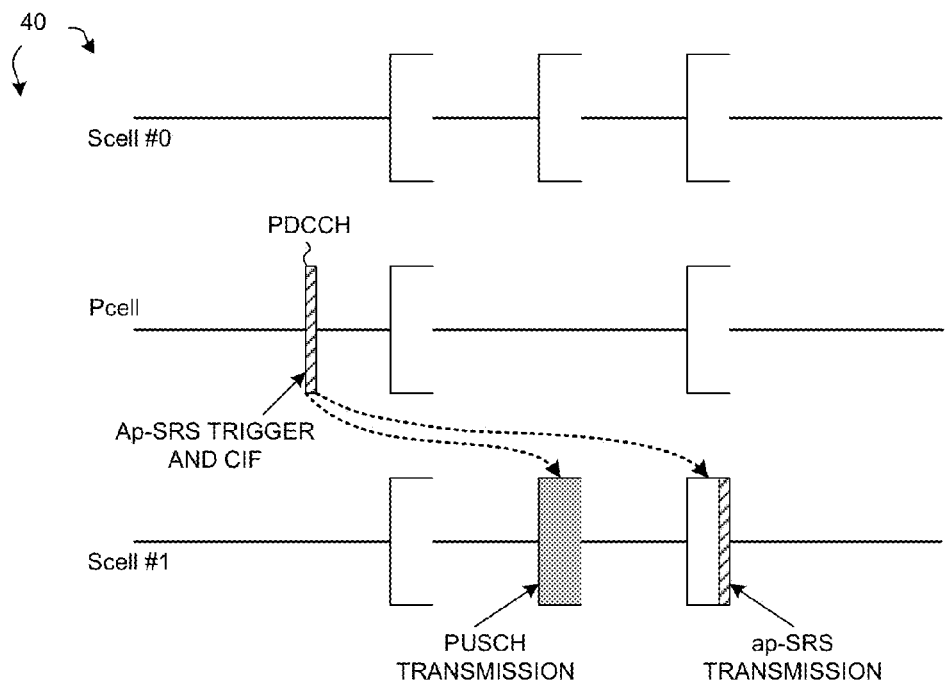
FIG. 4 illustrates one embodiment of the first method of uplink ap-SRS triggering mechanism

FIG. 4 illustrates one embodiment of the first "UE-specific triggering" method of uplink ap-SRS transmission mechanism in a multi-carrier LTE-A system 40. Multi-carrier LTE-A system 40 comprises an eNB and a UE. The eNB and the UE are connected over multiple RF carriers including a primary carrier (e.g., PCELL) and two secondary carriers (e.g., SCELL #0 and SCELL #1). The eNB transmits an uplink or downlink grant via a PDCCH. The PDCCH supports various downlink control information (DCI) formats. In each DCI format, there is an information field, which is called a "carrier indicator" (CIF). Typically, the "carrier indicator" indicates which carrier should use this uplink grant to do physical uplink share channel (PUSCH) data transmission or physical downlink shared channel (PDSCH) data reception. In one novel aspect, ap-SRS is transmitted over the same carrier used for PUSCH transmission, which is the carrier indicated by CIF. In the example of FIG. 4, the value of CIF in the uplink grant indicates carrier SCELL #1 (e.g., CIF="#1"). As a result, PUSCH transmission is scheduled over SCELL #1 based on the uplink grant (e.g., depicted as a grey-shaded area). In addition, ap-SRS transmission is also triggered over the same carrier SCELL #1 based on the same uplink grant (e.g., depicted as a slash-shaded area).

Figure 5:
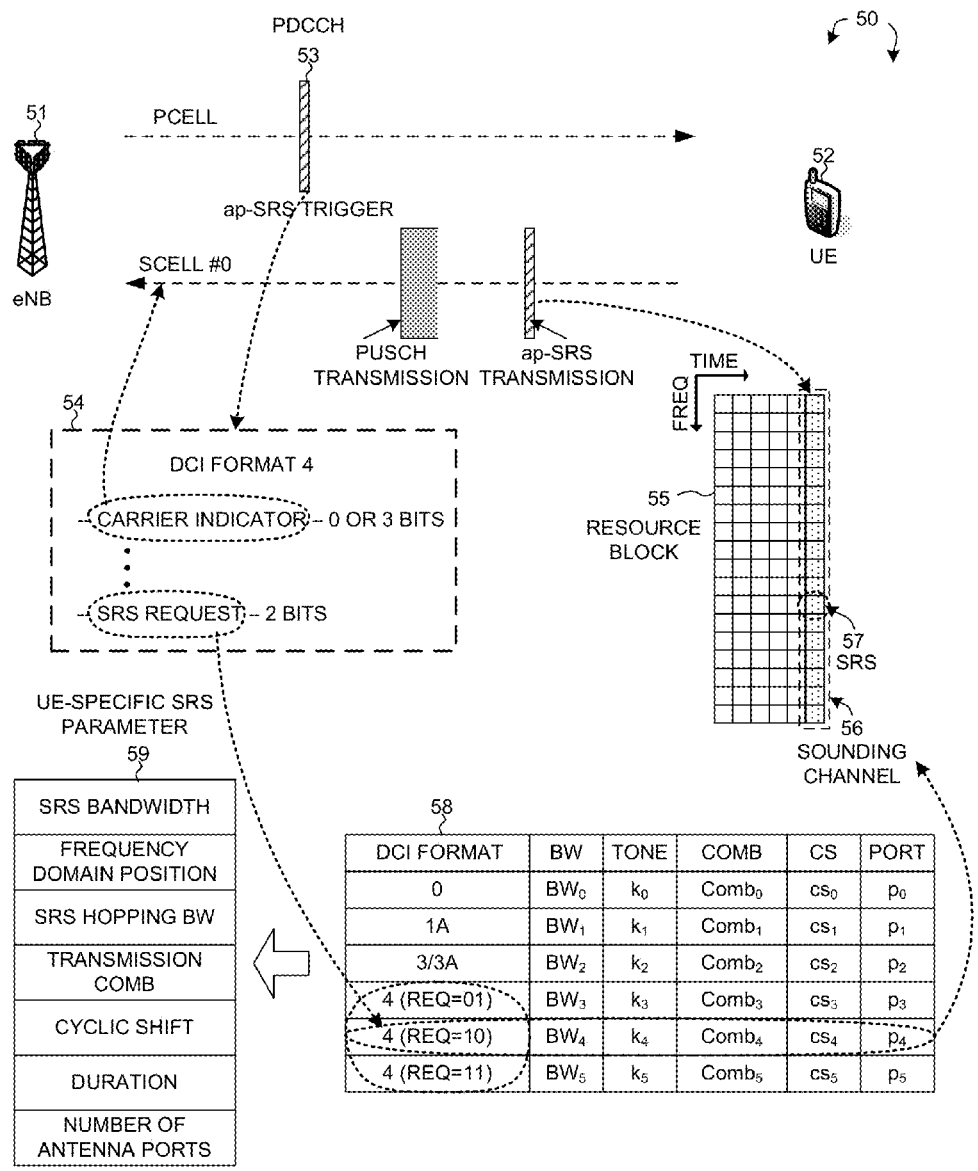
FIG. 5 illustrates a detailed example of the first method of uplink ap-SRS transmission.

FIG. 5 illustrates a detailed example of the first "UE-specific triggering" method of uplink ap-SRS transmission in a multi-carrier LTE-A system 50. Multi-carrier LTE-A system comprises an eNB 51 and a UE 52, connected with each other over a primary RF carrier PCELL and a secondary RF carrier SCELL #0. To trigger ap-SRS transmission, eNB 51 transmits an uplink grant via a PDCCH 53. In the example of FIG. 5, PDCCH 53 supports DCI Format 4 as illustrated in block 54. DCI format 4 contains a "carrier indicator" field (CIF) that is 0 or 3 bits long. The CIF is "#0" in format 4, and thus indicates the secondary carrier SCELL #0. Upon receiving the uplink grant, UE52 performs PUSCH transmission over SCELL #0 accordingly. In addition, UE52 also detects any triggering condition in the uplink grant and thereby determining whether to trigger ap-SRS transmission over SCELL #0. If the triggering condition is true, then UE52 selects the latest UE-specific RRC messages based on the value of CIF and transmits ap-SRS over SCELL #0 with the selected UE-specific parameters.

In 3GPP LTE-A systems, for configuring p-SRS or ap-SRS parameters, two types of SRS parameters are defined in 3GPP LTE-A systems for each component carrier. A first type of cell-specific parameters includes SRS bandwidth configuration and SRS subframe configuration. The cell-specific parameters are used to define the overall SRS resource allocated in a cell served by an eNB. A second type of UE-specific parameters (e.g., illustrated by table 59 in FIG. 5) includes SRS bandwidth allocation, SRS hopping bandwidth, frequency domain position, SRS duration, number of antenna ports, transmission comb, and cyclic shift (CS). The UE-specific parameters are used to define SRS resource allocation for each individual UE. The cell-specific parameters for p-SRS are re-used for ap-SRS because p-SRS and ap-SRS share the overall SRS resource. The UE-specific parameters for ap-SRS, however, are different from p-SRS such that ap-SRS can use residual resource that is not used by p-SRS by multiplexing between ap-SRS and p-SRS for each UE. Because cell-specific SRS parameters of p-SRS can be re-used for ap-SRS, only UE-specific parameters need to be selected for ap-SRS transmission.

Because UE-specific SRS parameters are configured via an upper layer RRC signaling, configuration time is long and signaling flexibility is low. To facilitate efficient SRS configuration, each DCI format is associated with one or more predefined sets of UE-specific SRS parameters. As illustrated by table 58 in FIG. 5, DCI Format 0, and Format 3/3A, each is associated with one set of UE-specific SRS parameters. For example, if DCI format 0 is used in an uplink grant via PDCCH 53, then a predefined SRS parameter set with SRS Bandwidth=BW0, frequency domain position=k0, transmission comb=comb0, cyclic shift=cs0, and antenna port=p0 is selected. Similarly, if DCI format 1A is used in an downlink grant via PDCCH 53, then a predefined SRS parameter set with SRS Bandwidth=BW1, frequency domain position=k1, transmission comb=comb1, cyclic shift=cs1, and antenna port=p1 is selected.

On the other hand, DCI format 4 is associated with three sets of UE-specific SRS parameters. FIG. 5 illustrates an example of DCI format 4 with an SRS request having two signaling bits. In the example of FIG. 5, eNB51 uses the two signaling bits to configure UE-specific ap-SRS parameters for UE52 via PDDCH 53. The two signaling bits can indicate four states, including three states for three sets of parameter combinations plus one state for no triggering of ap-SRS. Each of the three states indicates a predefined parameter combination of SRS bandwidth, frequency domain position, transmission comb, cyclic shift, and antenna port. For example, if SRS request=10, then a predefined SRS parameter set with SRS Bandwidth=BW4, frequency domain position=k4, transmission comb=comb4, cyclic shift=cs4, and antenna port=p4 is selected. UE52 then uses this set of SRS parameters to allocate sounding channel 56 and generate SRS 57 for ap-SRS transmission over the indicated carrier SCELL #0. The actual values of the pre-defined sets of UE-specific parameters can be updated or re-configured via RRC signaling whenever necessary. If SRS request=00, then no ap-SRS transmission is triggered.

Figure 6:
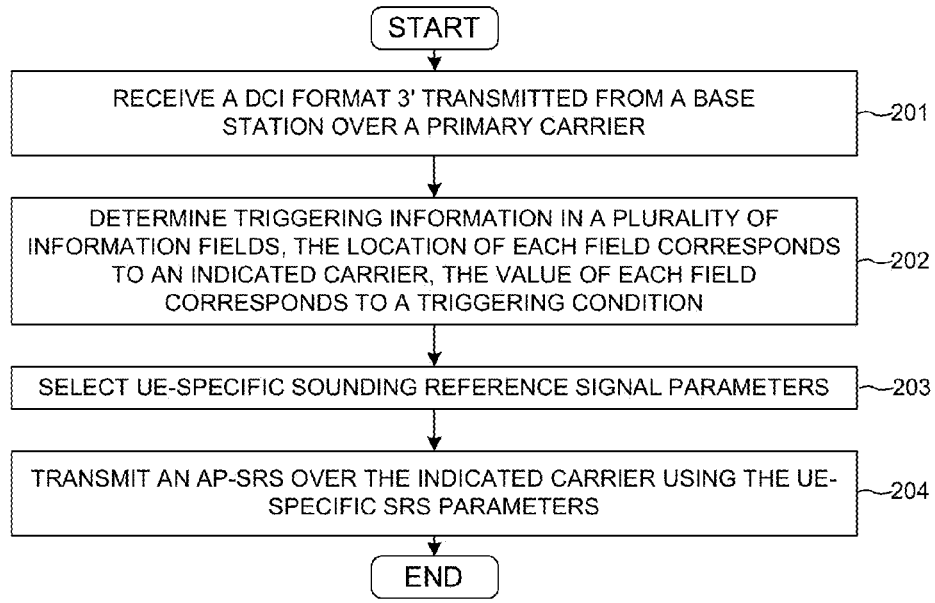
FIG. 6 is a flow chart of a second method of uplink ap-SRS transmission in accordance with one novel aspect.

FIG. 6 is a flow chart of a second method of uplink ap-SRS transmission in a multi-carrier LTE-A system in accordance with one novel aspect. The multi-carrier LTE-A system comprises an eNB and a UE. The eNB and the UE are connected over multiple radio frequency carriers including a primary RF carrier (e.g., PCELL over PCC) and one or more secondary RF carriers (e.g., SCELLs over SCCs). In step 201, the UE receives a DCI format 3/3A transmitted from the eNB in PCELL over PCC. In step 202, the UE determines triggering information in a plurality of information fields in the DCI format. The location of each information field corresponds to an indicated carrier of the UE, while the value of each information field corresponds to a triggering condition. If at least one of the triggering conditions is true, then the UE selects the latest configured UE-specific SRS parameters (step 203). Finally, the UE transmits an ap-SRS over the indicated carrier using the selected UE-specific SRS parameters (step 204). Because a group of UEs may be triggered for uplink ap-SRS transmission via the same DCI format, the second method of uplink ap-SRS triggering mechanism is also referred to as "group-wise triggering".

Figure 7:
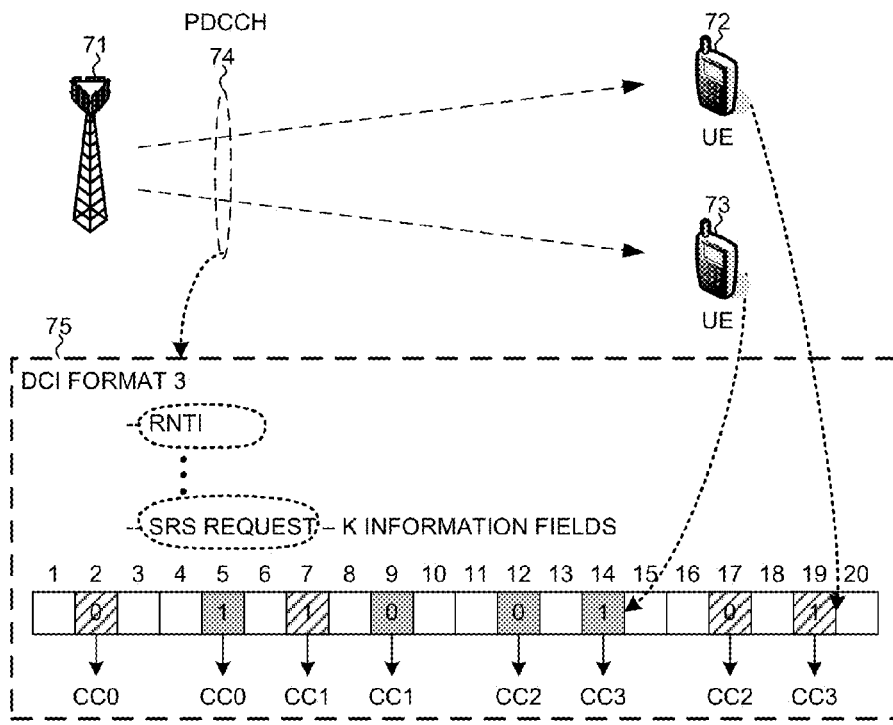
FIG. 7 illustrates one embodiment of the second method of uplink ap-SRS triggering mechanism.

FIG. 7 illustrates one embodiment of the second "group-wise triggering" method of uplink ap-SRS transmission mechanism in a multi-carrier LTE-A system 70. Multi-carrier LTE-A system comprises an eNB71, UE72, and UE73. Base station eNB71 and UE72, UE73 supports four component carriers CC0, CC1, CC2, and CC3. Suppose CC0 is the primary component carrier PCC, and the other three carriers are the SCCs. In a DL subframe, eNB71 broadcasts a PDCCH 74 to UE72 and UE73 over the primary carrier CC0. PDCCH 74 has a DCI Format 3/3A. DCI Format 3 is used for the transmission of the Transmit Power Control (TPC) commands for Physical Uplink Control Channel (PUCCH) and PUSCH with 2-bit power adjustments. Similarly, DCI Format 3A is used for the transmission of the Transmit Power Control (TPC) commands for PUCCH and PUSCH with 1-bit power adjustments.

In one novel aspect, a new DCI format similar to DCI format 3/3A is used to do group triggering of uplink ap-SRS transmission over multiple carriers. To avoid confusion, the new DCI format is referred to as DCI format 3'. DCI format 3' contains K information fields, and each field contains M bits. Additional x padding bits can be added so that the total number of bits in format 3' is equal to that of DCI format 3/3A. DCI Format 3' is sent to a group of UEs via broadcasting one PDCCH. Different UE groups can be differentiated by different Radio Network Temporary Identifier (RNTI) sequence. Within each UE group, each UE can be assigned N fields among the K information field. For each UE, each field indicates if the UE should enable ap-SRS in a specific carrier or not.

In the example of FIG. 7, block 75 illustrates one example of DCI format 3' in PDCCH 74. In this particular example, the SRS request contains total 20 information fields, each field contains one bit, and each UE is assigned with four fields (e.g., K=20, M=1, and N=4). UE72 is assigned with four information fields depicted by slashed shade, and UE73 is assigned with four information fields depicted by grey shade. Within each UE, each field indicates if the UE should enable ap-SRS in a particular carrier or not. In other words, the location of each field corresponds to a particular carrier, and the value of each field corresponds to whether ap-SRS is triggered or not. For UE72, fields 2, 7, 17, and 20 correspond to CC0, CC1, CC2, and CC3, respectively. In addition, because the value of each of those fields equals to 0, 1, 0, and 1, it indicates that ap-SRS is triggered for CC1 and CC3, but not for CC0 and CC2. Similarly, for UE73, fields 5, 9, 12, and 14 correspond to CC0, CC1, CC2, and CC3, respectively. In addition, because the value of each of those fields equals to 1, 0, 0, and 1, it indicates that ap-SRS is triggered for CC0 and CC3, but not for CC1 and CC2.

Once the UE determines that ap-SRS is triggered for one or more carriers, the UE selects SRS parameters and transmits ap-SRS signals over the indicated carrier(s). For example, UE72 transmits sp-SRS signals over CC1 and CC3, and UE73 transmits ap-SRS signals over CC0 and CC3 with selected SRS-parameters. For group triggering, cell-specific and UE-specific ap-SRS parameters of each carrier are also configured from RRC. Referring back to FIG. 5, for DCI Format 3/3A, a predefined SRS parameter set with SRS Bandwidth=BW2, frequency domain position=k2, transmission comb=comb2, cyclic shift=cs2, and antenna port=p2 is selected.

In addition to SRS parameter configuration, the eNB utilizes RRC signaling to configure each UE the following parameters for group triggering: the RNTI sequence which should be monitored for group triggering, the index of SRS triggering signal in a group (e.g., the number and location of the information fields that belong to each UE), and the corresponding carrier indexes for each UE.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving, by a user equipment (UE), an uplink or downlink grant transmitted from a base station over a primary carrier in a multi-carrier wireless communication system;
determining an indicated carrier from a carrier indication field (CIF) in the grant and detecting a triggering condition for aperiodic sounding transmission in the grant;
selecting UE-specific sounding reference signal (SRS) parameters, wherein the grant contains an SRS request that specifies the UE-specific SRS parameters; and
transmitting an aperiodic SRS (ap-SRS) over the indicated carrier using the UE-specific SRS parameters.

2. The method of claim 1, wherein the grant is transmitted in a physical downlink control channel (PDCCH), and wherein the PDCCH supports multiple downlink control information (DCI) formats.

3. The method of claim 2, where each DCI format contains the CIF, and wherein each DCI format contains a triggering bit for ap-SRS transmission.

4. The method of claim 2, wherein each DCI format corresponds to one or more predefined UE-specific SRS parameter sets configured via a radio resource configuration (RRC) message.

5. The method of claim 4, wherein DCI Format-4 corresponds to multiple predefined UE-specific SRS parameter sets, and wherein DCI Format-4 contains the SRS request having a value that corresponds to one of the multiple predefined UE-specific SRS parameter sets.

6. The method of claim 1, wherein the UE-specific SRS parameters are configured via a latest UE-specific radio resource configuration (RRC) message, and wherein the UE-specific SRS parameters comprises SRS bandwidth, frequency domain position, transmission comb, cyclic shift, and a number of antenna ports.

7. The method of claim 1, wherein the indicated carrier is also used for uplink data transmission via a physical uplink shared channel (PUSCH) or downlink data reception via a physical downlink shared channel (PDSCH).

8. A user equipment (UE), comprising:
an information decoding module that determines an indicated carrier from a carrier indication field (CIF) in an uplink or downlink grant and detects a triggering condition for aperiodic sounding transmission in the grant, wherein the grant is received by the UE from a base station over a primary carrier in a multi-carrier wireless communication system;
a sounding channel allocation module that selects UE-specific sounding reference signal (SRS) parameters, wherein the grant contains an SRS request that specifies the UE-specific SRS parameters; and
a transceiver that transmits an aperiodic SRS (ap-SRS) over the indicated carrier using the UE-specific SRS parameters.

9. The user equipment of claim 8, wherein the uplink or downlink grant is transmitted in a physical downlink control channel (PDCCH), and wherein the PDCCH supports multiple downlink control information (DCI) formats.

10. The user equipment of claim 9, where each DCI format contains the CIF, and wherein each DCI format contains a triggering field for ap-SRS transmission.

11. The user equipment of claim 9, wherein each DCI format corresponds to one or more predefined UE-specific SRS parameter sets configured via a radio resource configuration (RRC) message for each component carrier.

12. The user equipment of claim 11, wherein DCI Format-4 corresponds to multiple predefined UE-specific SRS parameter sets, and wherein DCI Format-4 contains the SRS request having a value that corresponds to one of the multiple predefined UE-specific SRS parameter sets.

13. The user equipment of claim 8, wherein the UE-specific SRS parameters are configured via a latest UE-specific radio resource configuration (RRC) message, and wherein the UE-specific SRS parameters comprises SRS bandwidth, frequency domain position, transmission comb, cyclic shift, and a number of antenna ports.

14. The user equipment of claim 8, wherein the indicated carrier is also used for uplink data transmission via a physical uplink shared channel (PUSCH) or downlink data reception via a physical downlink shared channel (PDSCH).

15. A user equipment (UE), comprising:
a receiver that receives a DCI format from a base station over a primary carrier in a multi-carrier wireless communication system;
an information decoding module that detects aperiodic sounding transmission triggering information contained in a plurality of information fields in the DCI format, wherein a location of each field corresponds to an indicated carrier, and wherein a value of each field corresponds to a triggering condition;
a sounding channel allocation module that selects UE-specific sounding reference signal (SRS) parameters; and
a transmitter that transmits an aperiodic sounding reference signal (ap-SRS) over one or more indicated carriers using the UE-specific SRS parameters.

16. The UE of claim 15, wherein the DCI format is transmitted in a physical downlink control channel (PDCCH), and wherein the PDCCH supports downlink control information (DCI) Format 3/3A.

17. The UE of claim 15, wherein the UE transmits the ap-SRS over a first indicated carrier triggered by a first information field, and wherein the UE transmits the ap-SRS over a second indicated carrier triggered by a second information field.

18. The UE of claim 15, wherein the DCI format is transmitted to a group of UEs, and wherein each UE is associated with a number of information fields of the uplink grant.

19. The UE of claim 18, wherein the number and location of the plurality of information fields associated with each UE is configured via a radio resource configuration (RRC) message.

20. The UE of claim 15, wherein the UE-specific SRS parameters are configured via a latest UE-specific radio resource configuration (RRC) message, and wherein the UE-specific SRS parameters comprises SRS bandwidth, frequency domain position, transmission comb, cyclic shift, and a number of antenna port.

* * * * *